United States Patent [19]
Ecuer et al.

[11] 4,454,747
[45] Jun. 19, 1984

[54] HIGH-LOW LEVEL CONTROL TEST METHOD AND APPARATUS

[75] Inventors: John H. Ecuer, Lafayette, La.; Michael D. Watkins, Garden City, Egypt

[73] Assignee: Standard Oil Company, Chicago, Ill.

[21] Appl. No.: 206,751

[22] Filed: Nov. 14, 1980

[51] Int. Cl.³ ............................................. G01F 25/00
[52] U.S. Cl. ................................................ 73/1 H
[58] Field of Search ................. 73/1 H; 340/623, 625, 340/514, 515; 200/84 R

[56] References Cited

U.S. PATENT DOCUMENTS 2,882,365  4/1959  MacCriff et al. ............... 200/84 R
3,060,717  10/1962  Howe ............................ 73/1 H
3,181,342  5/1965  Barengoltz ..................... 73/1 H
3,640,117  2/1972  Stilling ........................ 73/1 H Primary Examiner—S. Clement Swisher
Assistant Examiner—Hezron Williams
Attorney, Agent, or Firm—Scott H. Brown; Fred E. Hook

[57] ABSTRACT

An apparatus for testing the functioning of a float-activated liquid level control device comprises a float for activating a liquid level control device, a float cage enclosing said float, an entry port accessible from outside a separating tank through which fluid may be input directly into the float cage enclosure, and a flange connection for mounting the test apparatus inside a fluid separation tank. The method comprises connecting a fluid source to the input port of the apparatus of the instant invention, injecting fluid directly into the float cage enclosure to activate the float of the instant invention, monitoring the liquid level control device to insure that it is functioning correctly and then withdrawing the input fluid to return the float to its normal operating position.

4 Claims, 2 Drawing Figures

HIGH-LOW LEVEL CONTROL TEST METHOD AND APPARATUS

BACKGROUND OF THE INVENTION

The instant invention relates generally to well-known float-activated liquid level control devices and, more particularly, to a technique for testing the functioning of these float controllers. Float-activated control mechanisms are exceedingly well-known and have been used in a variety of apparatus as diverse as carburetors, toilets, dishwashers, and fluid level monitors. In particular, float-activated controllers have been employed in offshore gas/oil/water production separation equipment to shut-in offshore wells when the liquid level in the separation tank becomes either too high or too low.

The U.S. Geological Survey's offshore oil and gas production regulations require that separation equipment controllers are in proper working order and that they are tested monthly under working conditions. The goal of these regulations is to prevent sea pollution, for with the level controllers functioning properly, the wells are automatically shut-in when a disturbance in fluid production likely to cause pollution occurs.

Known methods of testing offshore float controllers have been subject to problems as the controllers to function properly must be in communication with liquids in the tank and are thus not too readily accessible from outside the tank. One method employs closing the separation equipment outlet line, thereby causing the liquid in the separation tank to backup and activate the high liquid level float-activated controller. It is then necessary to open the outlet valve and close the separation tank inlet valve to bleed off fluid in the separation tank to thereby check the low level controller to ensure that it is functioning properly. Obviously, this type of testing leads to potential human error in leaving one of the valves open or shut and is a time-consuming procedure. Another method for testing the functioning of these controllers to comply with the USGS regulations is the mounting of the controllers on the side of the separation tank in communication with the tank liquid level through a valving arrangement. These external controllers may be isolated from the tank by closing the valve connection, and then tested as in the previous method. This method leads to the same problem as human error can leave the communication valves closed, thereby eliminating liquid level control of the separation equipment and the procedure is again slow. The method and apparatus of the instant invention, however, eliminates the possibility of human error in the testing of such float control mechanisms and speeds up the test procedure by allowing direct access to an internal float-activated controller.

SUMMARY OF THE INVENTION

A method for testing the functioning of a float-activated liquid level control device for any type of liquid tank comprises the input of a fluid through an input port into an internal float cage means substantially surrounding a float means of said float control device. The cage means allows the float means to be in communication with fluids in the tank, and also permits a fluid to be injected into the cage means to activate the float controller by its effect on said float means. The control device can then be monitored to insure that it is operating satisfactorily. After it is noted that the control device is functioning properly, the fluid introduced into said cage means can be withdrawn through the inlet port or allowed to escape to the tank, thereby returning the float means to its normal operating position. The apparatus of the instant invention comprises a float cage means, a float means, an externally accessible fluid input port, and a connection means to mount the apparatus inside a fluid tank.

DESCRIPTION OF THE PREFERRED EMBODIMENT

Figure 1:
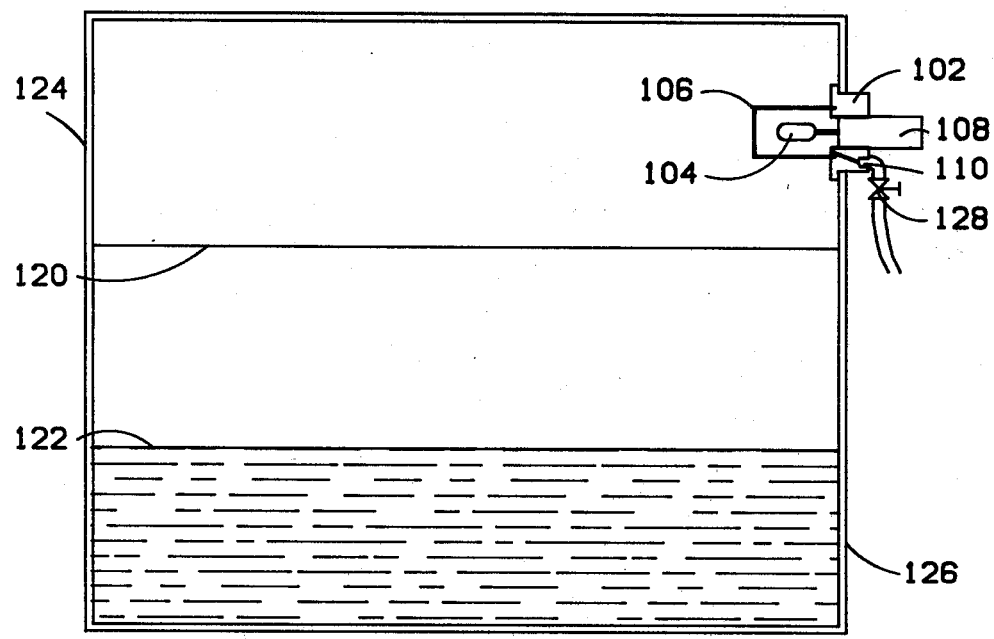
FIG. 1 displays the testing apparatus of the instant invention installed in a fluid tank.

FIG. 1 shows the apparatus of the instant invention as installed in a liquid tank 124. A high liquid level 120 in the separating tank and oil-water interface 122 inside the fluid tank are also shown. A valve means 128 connected to an input port 110 of the apparatus of the instant invention is also shown. The apparatus of the instant invention is mounted on tank wall 126 by a connection means 102. A float-activated control mechanism 108 is shown connected to a float means 104. The float means is substantially enclosed by a float cage 106.

Figure 2:
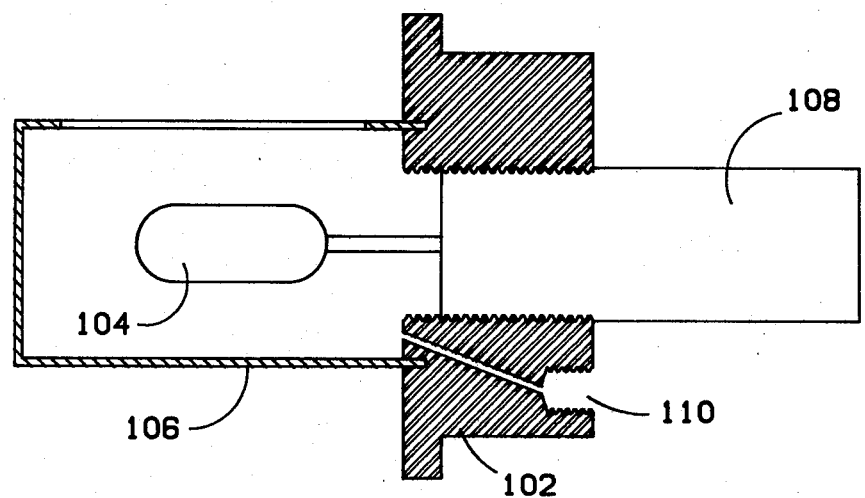
FIG. 2 shows a detail of the testing apparatus of the instant invention.

FIG. 2 shows a detail of the apparatus of the instant invention. The flange connection means 102 maintains the float cage 106 and float means 104 in connection with float controller mechanism 108. The flange 102 mounts the apparatus of the instant invention on the tank in such a manner that the float cage and float means are contained entirely inside the fluid tank. The input port means 110 allows the introduction of fluid directly into the cage means when employing the method of the instant invention to test the functioning of the float control mechanism 108. The input port is connected by suitable well-known methods to a valve means (128 in FIG. 1) external to the tank, which is not shown.

The apparatus of the instant invention then allows access to the float means 104, to activate the control mechanism 108 of the fluid level controller from outside tank without necessitating the opening and closing of main tank valves and thereby eliminates the possibility of human error. When testing the operation of the float-activated controller, it is necessary to open valve means 128 (FIG. 1) to allow access to fluid input port 110. However, this valve cannot be left open after disconnection of the input fluid source from fluid leaking out of the tank through input port 110 would be noticed immediately by the operator testing the apparatus. This differs from the known method of testing the controller in that the operator may not notice if he has left a valve open or closed after concluding testing of the apparatus. Allowing access to the float means directly from outside the tank through the input port 110 also permits testing in a much shorter time period than that required for shutting in the tank and allowing fluid to backup.

The method of the instant invention allows testing the proper functioning of a float-activated liquid level control device for use in any type fluid tank. The method has particular utility in offshore oil and gas production as government regulations require offshore fluid separation equipment to have liquid level control devices and that these level control devices by testing on a monthly basis be shown to be in proper operating condition. The method comprises activating an internal float means 104 for monitoring the actual level of fluids in a separation tank 124 by inputting fluid into a float cage means 106 containing the float means. The cage means does not fully enclose the float means and allows the float means to be in communication with liquid in the separating tank. The cage means is preferably a metal container having a wide slit on either the top side or the bottom side of the cage. The slit permits fluid communication between the inside of the tank and the inside of the cage. This construction of the cage means allows the float means to function as a liquid level control of fluids in the separation tank, yet also permits the float to be activated from outside the tank with minimum effort and no possibility of human error after the test.

The method continues by injecting fluid into the cage means 106 through an input port means 110 to activate the control device 108 by the injected fluid's effect on the float means 104. The injected liquid for testing the high liquid level controller is preferably oil. The float then rises by floating on the input oil, activating the controller mechanism when the float reaches its top extension. To test the low level controller a gas, preferably nitrogen, is injected through the input port, which forces the float means to sink, as the float will not float on gas. The control mechanism 108 is then monitored in each case to ensure that it is functioning properly after being activated by the injected fluid's effect on float means 104. When testing is complete, the controllers are returned to their normal operating mode by withdrawing oil from the cage means through the input port 110 or allowing the gas to escape to the top of the separating tank. By this method then, it is possible to simulate the actual functioning of a high or low level controller while in operating position inside the tank.

The construction of the apparatus of the invention can be of any of several well-known materials able to withstand the possible corrosive environment due to contact with fluids in the tank in which it is installed. The flange connection means 102 can be of several well-known types such as a Yale hammer or a flange type nozzle connection. The actual thickness of the connection means will depend upon the pressure encountered inside the fluid tank. Obviously, a high pressure tank will require a thicker connection than a low pressure tank. The float cage means 106 is preferably constructed so that it is long enough to incorporate the float means 104 of any desired well-known float control mechanisms. These floats in a preferred embodiment are those of a Norris or Fisher float controller which are 10" long; therefore, the float cage means is preferably 12" long to enclose the float means.

The float cage means is slotted about 1" wide on either a top or a bottom surface of the cage depending on the type of level control desired. If it is a high level control, the method of the instant invention requires that fluid be input into the cage means to activate the float control by forcing float means 104 to float upwards. Therefore, the slot in the cage means must be on the top to allow fluid to be injected into the cage means, yet remain there to force the float to move upward and activate the float control mechanism 108. It is also preferable to have the input port 110 attached to the cage means so that the testing fluids enter the cage means near the bottom of the cage. The cage is also slotted to allow the float means to be in fluid communication with the level of fluids in the tank. In normal operation, the high level float is in the down position in the float cage means. When a high liquid level occurs inside the tank, liquid will enter into the float cage means through the slot on top of the cage means and force the float to rise to the top, thereby activating the float control mechanism.

Opposite to checking the high level control, in testing the low level control the slot in the float cage means 106 is on the bottom surface below float means 104. In normal operation of the low level control the float means will be floating on liquid in the cage which has entered the cage through the slot in the bottom of the cage. The float will thus normally be in the up position and, only when there is no liquid for the float means to float upon, will a signal be sent activating the float control mechanism 108. To test the low level controller requires only that all fluid having enough density to support the float means be removed from the float cage means. This is easily done by injecting a gaseous fluid through input port 110 into the float cage means. The input port for the low level tester is preferably located at the top of the cage means. The injected gas then forces liquid out of the cage means, which causes the float to drop and activate the control mechanism. This is exactly analogous to the operation in normal operating mode where liquid exits the cage means through the slot in the bottom when the liquid level in the tank drops, the float means sinks and activates the control mechanism.

This testing apparatus and method finds its greatest utility in testing the operation of float controllers used in offshore gas-water-oil separators. When activated in both cases, the control mechanism shuts in the offshore wells. However, the float-activated controller test apparatus and method can be employed with any liquid level control mechanism utilizing a float.

The method and apparatus of the instant invention have been used successfully on an Amoco Production Company High Island platform off the coast of Louisiana. The apparatus employs a float cage means 106 of 12" long incorporating a Norris float-activated controller wherein the float 104 is 10" long. The flange connection means 102 is a standard 2" thick Yale connection flange. The input port 110 was machined as in FIG. 2 and employed a standard coupling fitting with a valve external to the port for coupling of a pump to input fluid into the cage means during use of the method of the instant invention. The test apparatus was installed in a standard three-phase (gas/oil/water) separator tank built by Sivals, Inc. Three of the test apparatus were installed in each tank. One was connected to the high liquid level controller monitoring the overall height of liquid in the separating tank. The second was installed in the oil box containing separated oil inside the tank and functioned as a low level controller tester. The third also tested a low liquid level controller installed in the water box inside the tank which contains separated water withdrawn through a standard weir arrangement.

It should be obvious that the scope of the instant invention disclosed herein is not described by the specification, rather the scope is all of the extent given of the appended claims.

We claim:

1. A float level control testing apparatus mounted to a liquid containment vessel, comprising:
a flanged connector extending through an opening in the wall of the liquid containment vessel and attached thereto, the flanged connector having a horizontal bore extending therethrough for removable support of a float level control device which has a float hingeably connected thereto and extending into the interior of the liquid containment vessel, a fluid cage connected to the flanged connector and disposed within the interior of the liquid containment vessel, the fluid cage having an opening therethrough for entry and removal of liquid within the liquid containment vessel, and a fluid passageway extends through the flanged connector from the exterior of the liquid containment vessel to the interior of the cage adjacent a lower portion thereof, the exterior opening of the fluid passageway being provided with connection means for removal interconnection to a source of test fluid, whereby the test fluid is introduced into the interior of the cage through the fluid passageway to displace the float which provides an indication of the operability of the float level control device.

2. Float level control testing apparatus of claim 1 wherein the liquid containment vessel is an oil-water separator.

3. Float level control testing apparatus of claim 1 wherein the opening within the fluid cage extends through an upper portion thereof and the test fluid is a liquid.

4. Float level control testing apparatus of claim 1 wherein the opening within the fluid cage extends through a lower portion thereof and the test fluid is a gas.

* * * * *